June 5, 1962 W. K. STEINHAGEN 3,037,763
VEHICLE SUSPENSION
Filed June 3, 1959 2 Sheets-Sheet 1
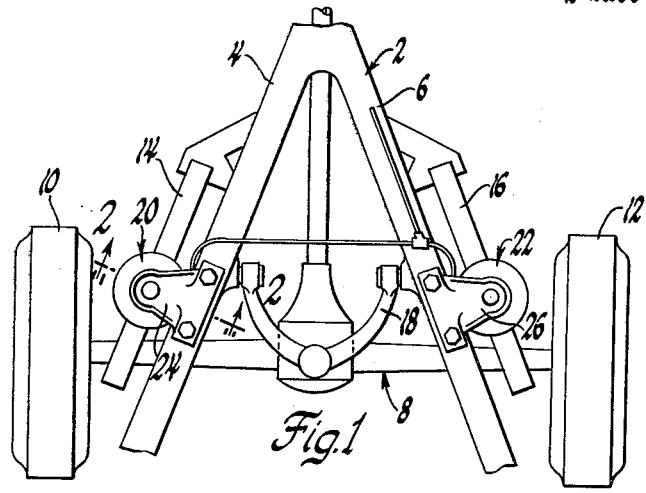
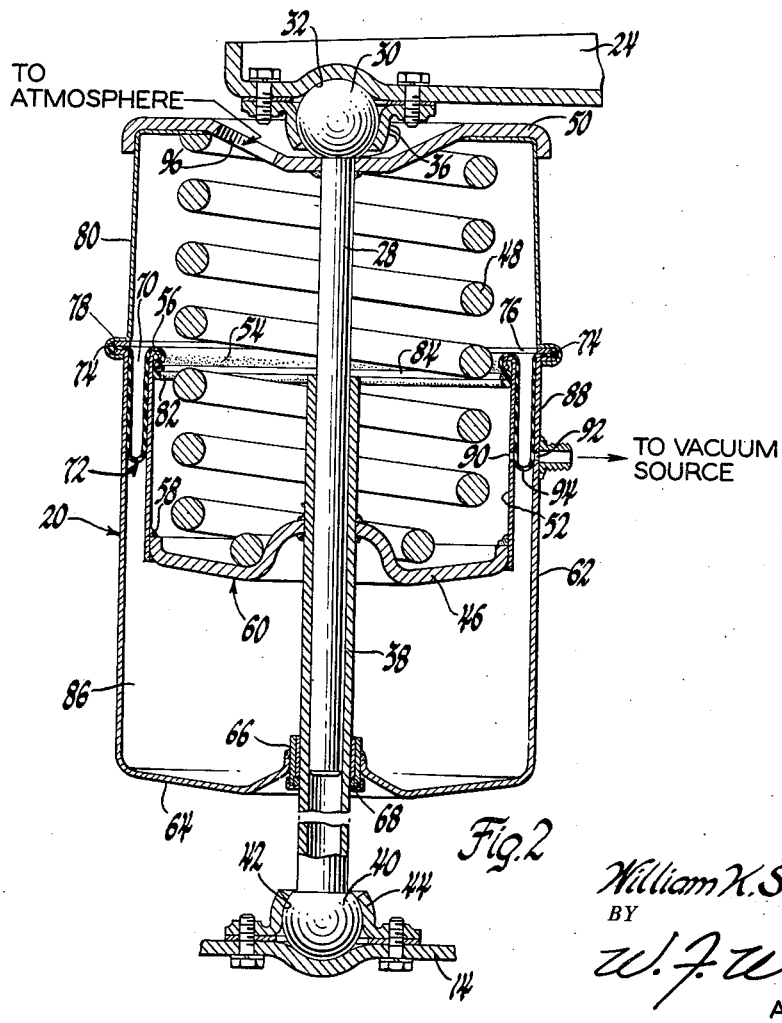
INVENTOR.
William K. Steinhagen
BY
W. F. Wagner
ATTORNEY June 5, 1962  W. K. STEINHAGEN  3,037,763
VEHICLE SUSPENSION Filed June 3, 1959 2 Sheets-Sheet 2

INVENTOR.
William K. Steinhagen
BY
W. F. Wagner
ATTORNEY

United States Patent Office 3,037,763
Patented June 5, 1962

3,037,763
VEHICLE SUSPENSION
William K. Steinhagen, Royal Oak, Mich., assignor to General Motors Corporation, Detroit, Mich., a corporation of Delaware
Filed June 3, 1959, Ser. No. 817,813
7 Claims. (Cl. 267—34)

This invention relates to vehicle suspension and more particularly to vehicle suspension of the type utilizing springs adapted to maintain constant road clearance of the sprung mass irrespective of load.

An object of the invention is to provide an improved vehicle suspension.

Another object is to provide a vehicle suspension incorporating automatically operable load leveling means.

A further object is to provide a suspension system incorporating a composite elastic medium including a constant rate spring and a variable rate spring, one of which functions primarily to regulate the vehicle standing height.

Still another object is to provide a vehicle suspension utilizing coil springs as the primary elastic medium and auxiliary fluid springs which function mainly to maintain the sprung mass of the vehicle at a predetermined height.

Still a further object is to provide an arrangement of the stated character wherein the coil spring and the fluid spring are axially aligned but operate in parallel.

A yet further object is to provide an arrangement of the type described wherein the coil spring is surrounded by the fluid spring.

A still further object is to provide a suspension of the stated character wherein the fluid spring utilizes subatmospheric pressure, and control of the displaced relation thereof is accomplished as a direct function of displacement relation of spring components.

These and other objects, advantages, and features of the invention will become more fully apparent as reference is had to the accompanying specification and drawings wherein:

FIG. 1 is a fragmentary plan view of the rear portion of a vehicle chassis, illustrating a rear wheel suspension incorporating the invention;

FIG. 2 is an enlarged fragmentary view, partly in section and with parts broken away, looking in the direction of arrows 2—2 of FIG. 1, illustrating the form and arrangement of parts of a composite spring assembly according to the invention;

Figure 3:
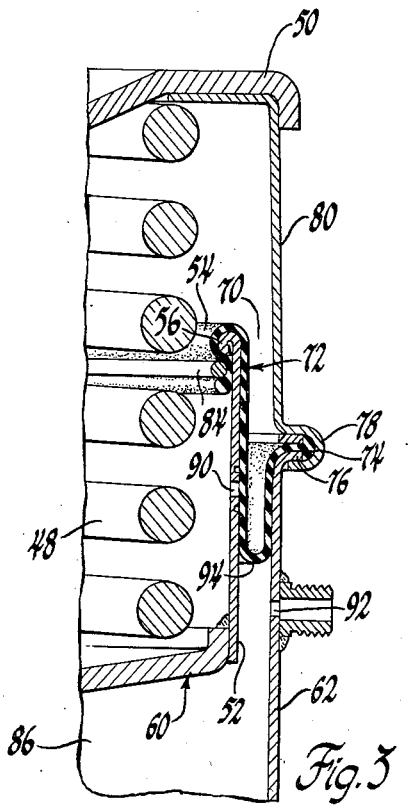
FIG. 3 is a greatly enlarged fragmentary sectional elevation of a portion of the spring shown in FIG. 2, illustrating the relationship of parts when the spring assembly is in a partial bump position.

Referring now to the drawings and particularly FIG. 1, reference numeral 2 designates generally the vehicle sprung mass or frame which in the illustrated embodiment includes a pair of rearwardly diverging leg portions 4 and 6. Extending transversely beneath legs 4 and 6 is a rear axle assembly 8, at opposite ends of which are rotatably supported traction wheels 10 and 12. Axle assembly 8 is deflectably connected to frame 2 by means of a pair of laterally spaced trailing lower control arms 14 and 16 and an A-frame type trailing upper control arm 18. In order to resiliently support the sprung mass 2 relative to axle assembly 8, there are provided a pair of composite spring assemblies 20 and 22 which are disposed respectively between control arms 14 and 16 and frame outrigger portions 24 and 26, respectively.

In accordance with the general features of the invention, spring assemblies 20 and 22 function to maintain the vehicle sprung mass at a predetermined height clearance irrespective of the load supported thereon. Inasmuch as both spring assemblies 20 and 22 are identical in construction, the following description of spring assembly 20 will be understood to apply equally to both.

As seen best in FIG. 2, assembly 20 includes a depending rod 28 having an upper integral ball end 30 which is received in a socket 32 forced by outrigger 24 and apertured bracket 36. Rod 28 is telescopingly received in an upwardly extending tubular member 38 having a lower ball end 40 which is received in a socket portion 42 formed by control arm 14 and apertured bracket 44. Near the upper end thereof, tubular end 38 has secured thereto as by welding a dished circular plate 46 which forms the lower seat for a coil spring 48. The upper end of coil spring 48, in turn, engages a circular upper spring seat 50 secured as by welding to rod 28 immediately below ball end 30.

In accordance with the principal feature of the invention, coil spring 48 is surrounded by a vacuum operated fluid spring which functions automatically to provide variable resilient support for the vehicle sprung mass which increases or decreases proportional to the load imposed thereon. While the mode of operation of the vacuum operated spring is generally similar to that disclosed in the copending application of Philip L. Francis, Serial No. 813,160, now Patent No. 2,998,244, entitled "Self-Leveling Fluid Spring," assigned to General Motors Corporation, the present invention involves certain highly significant features which permit the fluid spring to be disposed around the coil spring and thereby eliminate any significant increase in space beyond that already required for the coil spring alone. To accomplish this purpose in accordance with the invention, lower spring seat 46 has attached thereto an upwardly extending cylindrical member 52, the upper open end 54 of which terminates in a peripheral inturned bead 56. Member 52 and seat 46 are connected by a fluid tight joint such as welding 58 so as to provide an inverted cup-shaped piston 60 which closely surrounds the lower group of coils of coil spring 48. Surrounding piston 60 and vertically slidably relative to tubular member 38 is a spring cylinder 62 having a closed bottom wall 64 to which is attached a bushing 66 through which tubular member 38 extends. Bushing 66, in turn, is provided with a sphincter seal 68 which tightly engages tubular member 38 to provide a fluid tight sliding connection.

Extending between the annular interval 70 between the upper open end of cylinder 62 and the upper open end of piston 60 is a rolling diaphragm element 72. The outer periphery 74 of diaphragm 72 is clamped to the radial flange 76 of cylinder 62 by the crimped lower lip 78 of cylindrical shroud 80, the upper end of which engages upper spring seat 50. The inner periphery 82 of diaphragm 72, in turn, is secured to the bead 56 of piston 60 by a compression ring 84. In this manner, a sub-atmospheric fluid working space 86 is provided between cylinder 62 and piston 60, while permitting normal extension and compression of coil spring 48.

In order to control the level of vacuum present within the sub-atmospheric working space 86, piston wall 52 and the radially adjacent wall portion 88 of cylinder 62 are provided with a pair of ports 90 and 92, respectively, which are located slightly above the loop extremity 94 of diaphragm 72 when spring assembly 20 is in the normal displaced position shown in FIG. 2. As seen best in FIG. 3, when additional load is imposed on the vehicle sprung mass, such load increase causes simultaneous compression deflection of spring 48 and downward displacement of shroud 80, the latter of which imparts downward movement to cylinder 62. However, since piston 60 is rigidly attached to tubular member 38, the vertical position of the former remains unchanged. Therefore, cylinder 62 descends with respect to piston 60. The change in displacement relation just described causes diaphragm 72 to peel off the wall of cylinder 62 and onto the wall of piston 60, which results in uncovering port 92 and increasing overlap of port 90. The sub-atmospheric working space 86 in cylinder 62 is, therefore, placed in communication with the vacuum source, not shown, which thereupon increases the vacuum level acting on the piston. As the vacuum level increases, the pressure exerted by atmospheric air against the effective piston diameter causes the cylinder 62 to ascend toward the normal displaced position shown in FIG. 2. The force exerted by this ascending movement is transmitted through shroud 80 to outrigger 24 and restores the sprung mass of the vehicle to the original height clearance. Simultaneously, diaphragm 72 resumes the overlapping engagement relation shown in FIG. 2 wherein both ports 90 and 92 are blocked and thereby prevent either increase in vacuum level of working space 86 or bleeding therefrom through port 90 and ultimately to atmosphere through aperture 96 in upper spring seat 50.

Figure 4:
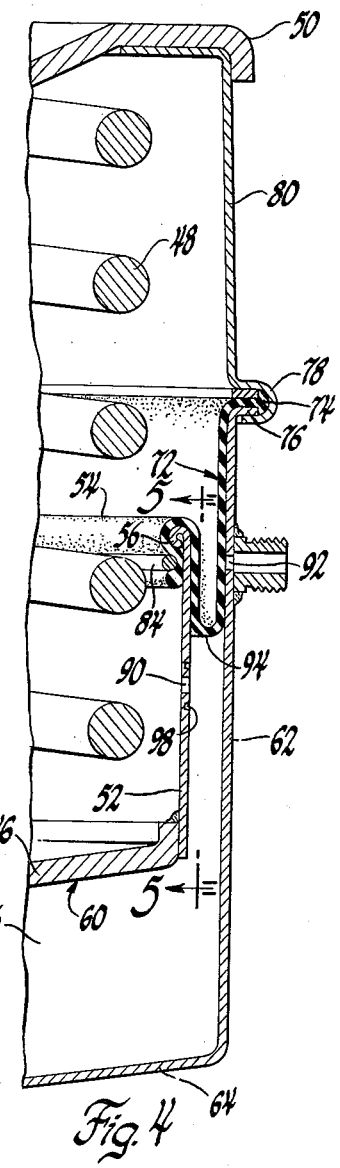
FIG. 4 is a view similar to FIG. 3 illustrating the relationship of parts when the assembly is in a partial rebound position.

When the load on the sprung mass is reduced below normal, reverse displacement of cylinder 62 and piston 60 takes place. As illustrated in FIG. 4, displacement of the cylinder and piston resulting from reduced load causes the diaphragm 72 to peel away from piston wall 52 and onto the wall of cylinder 62, with the result that atmosphere bleed port 90 is uncovered while overlapping of port 92 is increased. Accordingly, atmospheric air is permitted to enter through aperture 96 and port 90 into sub-atmospheric working space 86, thereby allowing cylinder 62 to descend until the normal vehicle height clearance has been restored.

While the description of operation of the vacuum spring has been made without reference to the concurrent influence of the coil spring 48, it will be evident that the latter will continue to function in the conventional manner owing to the fact that it is disposed so as to react directly between outrigger 24 and control arm 14. Therefore, certain aspects of the auxiliary load supporting and leveling function of the vacuum spring will vary according to the load deflection characteristics of the coil spring. However, since the particular ratio of load supported by the coil spring and the vacuum spring respectively forms no part of the present invention, discussion thereof is omitted herein, it being understood that any desired ratio may be employed.

Figure 5:
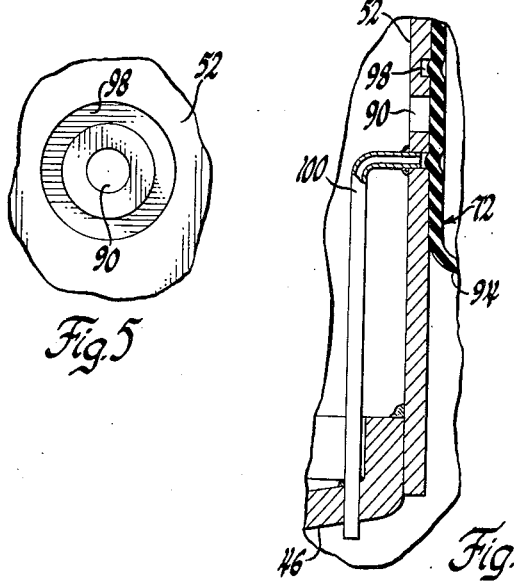
FIG. 5 is a fragmentary view looking in the direction of arrows 5—5 of FIG. 4.

In FIGS. 3, 4 and 5 it will be observed that the outer surface of piston wall 52 has an annular groove 98 formed therein which surrounds atmosphere bleed port 90. Groove 98 serves to insure efficient sealing of port 90 by diaphragm 72 by providing an annular cavity subject to sub-atmospheric pressure, which urges the portion of diaphragm bounded thereby into sealing engagement with port 90. For a more complete description of the manner in which groove 98 functions, reference may be had to co-pending application Serial No. 813,160, Philip L. Francis, entitled "Self-Leveling Fluid Spring."

Figure 6:
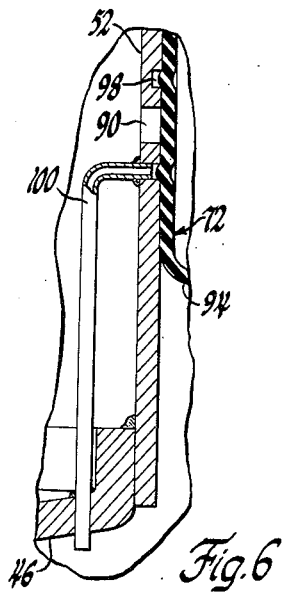
FIG. 6 is an enlarged fragmentary sectional view illustrating a modification of the construction shown in FIGS. 3 and 4.

In FIG. 6 there is shown a modified form of piston construction wherein the groove 98 is placed in continuous communication with the sub-atmospheric working space 86 by a tube 100 connected at one end to the groove and having its other end extending through lower spring seat 46.

In connection with the foregoing, it is to be especially noted that in the present invention the coil spring 28 is disposed essentially within the fluid spring and yet the entire coil spring occupies no part of the fluid spring working space. By way of comparison, in the prior art composite mechanical and fluid springs usually require that the coil spring either surround the fluid spring or that the former be contained entirely within the working space of the latter. Other arrangements wherein the coil spring and fluid spring are merely axially aligned fail to accomplish the intended purpose, since such arrangements have the effect of placing both elastic mediums in series.

It is also to be noted that the present invention permits the adoption of a self-leveling vacuum energized auxiliary spring in a conventional coil spring suspension with little or no modification as regards existing clearance space, since the increase in physical size of the entire composite spring over that of the existing coil spring is relatively slight. Furthermore, even to the extent that some additional diametral clearance is required, the additional space requirement is entirely concentric with the space already necessary, rather than involving provisions for increased space in some previously occupied area.

While but two embodiments of the invention have been shown and described, it will be apparent that other changes and modifications may be made therein. It is, therefore, to be understood that it is not intended to limit the invention to the embodiments shown, but only by the scope of the claims which follow.

I claim:
1. A composite coil and fluid spring assembly comprising, an upper and a lower spring seat for said coil spring, a coil spring disposed between said seats, said lower spring seat including a cylindrical portion surrounding the lower part of said coil spring, a casing surrounding said cylindrical portion, said casing having a closed end and being movable relative to said lower spring seat, the periphery of said casing and of said cylindrical portion being spaced radially to form an annular interval therebetween, a flexible diaphragm connected to said casing and cylindrical portion and closing said annular interval, and means formed in the periphery of said casing and said cylindrical portion respectively cooperating with said flexible diaphragm effective to control fluid flow into and out of said spring responsive to variation in displacement relation of said cylinder and casing.

2. A composite coil and fluid spring assembly comprising, an upper and a lower spring seat for said coil spring, a coil spring disposed between said seats, said lower spring seat including a cylindrical portion surrounding the lower part of said coil spring, a casing surrounding said cylindrical portion, said casing having a closed end and being movable relative to said lower spring seat, the periphery of said casing and of said cylindrical portion being spaced radially to form an annular interval therebetween, a flexible diaphragm connected to said casing and cylindrical portion and closing said annular interval, and passage means formed in the periphery of said casing and said cylindrical portion respectively cooperating with said flexible diaphragm effective to control fluid flow into and out of said spring responsive to variation in displacement relation of said cylinder and casing.

3. A composite coil and fluid spring assembly comprising, an upper and lower spring seat for said coil spring, a coil spring disposed between said seats, said lower spring seat including a cylindrical portion surrounding the lower part of said coil spring, a casing surrounding said cylindrical portion and movable with said upper spring seat, said casing having a closed lower end and being movable relative to said lower spring seat, the periphery of said casing and of said cylindrical portion being spaced radially to form an annular interval therebetween, a flexible diaphragm connected to said casing and cylindrical portion and closing said annular interval, and passage means formed in the periphery of said casing and said cylindrical portion respectively cooperating with said flexible diaphragm effective to control fluid flow into and out of said spring responsive to variation in displacement relation of said cylinder and casing.

4. A composite coil and fluid spring comprising, a telescoping rod and tube assembly, a first spring seat at one end of said rod, a second spring seat at one end of said tube, a coil spring disposed around said rod and tube between said seats, said second spring seat including a cylindrical portion surrounding the lower part of said coil spring, a casing surrounding said cylindrical portion, said casing having a closed end formed with a bushing slidably engaging said tube, said casing and said cylindrical portion being spaced radially to form an annular interval therebetween, a flexible diaphragm connected to said casing and cylindrical portion and closing said annular interval, inlet and outlet means formed in the wall of said casing and cylindrical portion respectively coacting with said diaphragm to control fluid flow into and out of said spring responsive to variation in displacement relation of said cylinder and casing, and means connecting said casing to said rod independently of said coil spring.

5. A composite coil and fluid spring assembly comprising, a telescoping rod and tube structure, a first spring seat fixed to the upper end of said rod, a second spring seat fixed to the upper end of said tube, a coil spring disposed around said rod and tube between said seats, said second spring seat including an upwardly extending cylindrical portion surrounding the lower part of said coil spring, a casing surrounding said cylindrical portion, said casing having a closed end slidably engaging said tube in fluid tight relation, said casing and said cylindrical portion being spaced radially to form an annular interval therebetween, a flexible diaphragm connected to said casing and cylindrical portion and closing said annular interval, said diaphragm including a depending loop portion overlying the radially adjacent walls of said casing and cylindrical portion, and a pair of ports formed in the wall of said casing and cylindrical portion respectively, said ports being alternately opened and closed by variation in diaphragm overlap incident to variation in axial displacement relation of said cylinder and casing, one of said ports being connected to a source of fluid pressure and the other of said ports being open to atmosphere.

6. In a vehicle having a sprung and unsprung mass, a composite coil and fluid spring assembly disposed between said sprung and unsprung mass, said assembly comprising a telescoping rod and tube structure, means pivotally connecting the upper end of said rod to said sprung mass and the lower end of said tube to said unsprung mass, an upper spring seat fixed on said rod, a lower spring seat fixed on said tube, a coil spring disposed around said rod and tube between said seats, said lower spring seat being formed to provide a cup-shaped piston, a casing surrounding said piston, said casing including a closed bottom wall formed with a bushing slidably engaging said tube, said casing having an open upper end and being spaced radially from said piston to form an annular interval therebetween, a flexible diaphragm connected to said casing and cylindrical portion and closing said annular interval to form a closed fluid cavity between said piston and cylinder, inlet and outlet means formed in radially adjacent portions of the wall of said casing and said piston respectively, coacting with said diaphragm to control fluid flow into and out of said cavity responsive to variation in displacement relation of said piston and casing, and means connecting said casing to said upper spring seat independently of said coil spring.

7. In a vehicle having a sprung and unsprung mass, a composite coil and fluid spring assembly disposed between said sprung and unsprung mass, said assembly comprising a telescoping rod and tube structure, means pivotally connecting the upper end of said rod to said sprung mass and the lower end of said tube to said unsprung mass, an upper spring seat fixed on said rod, a lower spring seat fixed on said tube, a coil spring disposed around said rod and tube between said seats, said lower spring seat being formed to provide a cup-shaped piston, a casing surrounding said piston, said casing including a closed bottom wall formed with a bushing slidably engaging said tube, said casing having an open upper end and being spaced radially from said piston to form an annular interval therebetween, a flexible diaphragm connected to said casing and cylindrical portion and closing said annular interval to form a closed fluid cavity between said piston and cylinder, inlet and outlet means formed in radially adjacent portions of the wall of said casing and said piston respectively, coacting with said diaphragm to control fluid flow into and out of said cavity responsive to variation in displacement relation of said piston and casing, and means connecting said casing to said upper spring seat independently of said coil spring, said last mentioned means comprising a circular shroud having an aperture providing communication between atmosphere and said outlet means.

References Cited in the file of this patent
UNITED STATES PATENTS

| | | |
|---|---|---|
| 1,550,081 | Liebau | Aug. 18, 1925 |
| 1,840,178 | Transom | Jan. 5, 1932 |
| 1,956,669 | Charles | May 1, 1934 |
| 2,720,378 | Otto | Oct. 11, 1955 |
| 2,790,650 | Boschi | Apr. 30, 1957 |

OTHER REFERENCES

German application Ser. No. C12,176, printed Dec. 13, 1956, (K1. 63C 41).